United States Patent [19]

Schnitzer

[11] 3,890,205
[45] June 17, 1975

[54] ROTARY DESALINATION ENGINE AND SYSTEM
[75] Inventor: Emanuel Schnitzer, Houston, Tex.
[73] Assignees: Frontier Engineering Corporation, Houston; H. B. Zachry Company, San Antonio, both of Tex.; part interest to each
[22] Filed: July 17, 1974
[21] Appl. No.: 489,363

Related U.S. Application Data
[63] Continuation-in-part of Ser. Nos. 252,202, May 11, 1972, abandoned, and Ser. No. 427,793, Dec. 26, 1973.

[52] U.S. Cl. .................. 202/236; 203/22; 203/89; 203/26; 203/10
[51] Int. Cl. ........................ B01d 3/08; B01d 3/28
[58] Field of Search ............. 203/89, 24, 26, 21, 22, 203/25; 202/238, 236; 159/4 S, 4 SR, 6 R, 11 B

[56] References Cited
UNITED STATES PATENTS

| 2,188,506 | 1/1940 | Hall ........................ 159/4 S |
| 2,210,928 | 8/1940 | Hickman .................. 202/236 |
| 2,349,431 | 5/1944 | Hickman .................. 159/6 R |
| 2,734,023 | 2/1956 | Hickman .................. 203/26 |
| 2,999,796 | 9/1961 | Bromley .................... 202/236 |
| 3,200,050 | 8/1965 | Hogan et al. ............. 203/24 |
| 3,282,798 | 11/1966 | Tidball .................... 202/236 |

FOREIGN PATENTS OR APPLICATIONS
622,123  11/1935  Germany ............................ 159/4 S Primary Examiner—Norman Yudkoff
Assistant Examiner—Frank Sever
Attorney, Agent, or Firm—Hubbard, Thurman, Turner & Tucker

[57] ABSTRACT

A rotary heat exchanger device is disclosed for transferring heat energy between two fluids. The rotary heat exchanger device of the present invention utilizes one or more high speed, thin rotating discs as heat transfer surfaces between such fluids as a boiling and a condensing fluid. The disc or discs are rotated at such high speed that the extreme centrifugal force of hundreds of times the force of gravity reduces the insulating liquid film to a micro-thin liquid film wherein greatly improved heat transfer coefficients are obtained. Provided in the rotating disc chamber housing is a centrifugal liquid seal to separate the boiling and condensing chambers which is combined with a naturally pressurized fluid discharge at the disc periphery. The rotary heat exchanger device of the present invention also incorporates other unique and novel components such as an easily cleanable tri-liquid counterflow spiral heat exchanger and degasser devices to prevent dissolved gas from accumulating in and blocking the purifying system.

7 Claims, 9 Drawing Figures

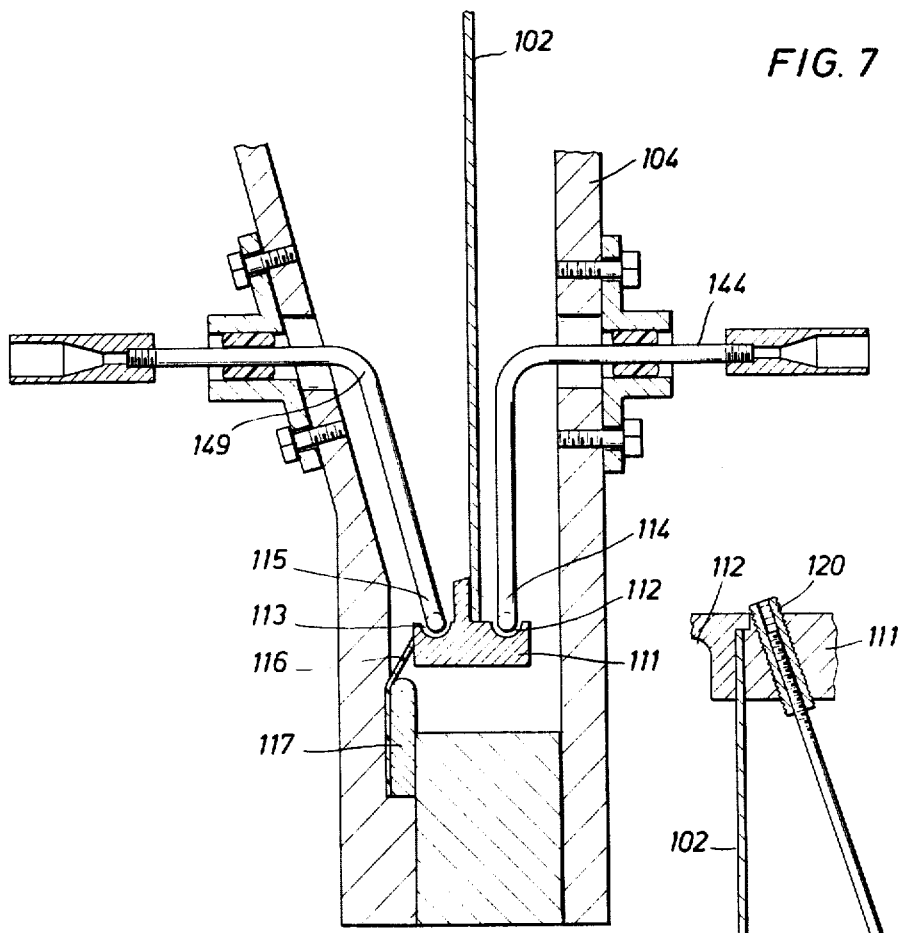
FIG. 7
FIG. 8
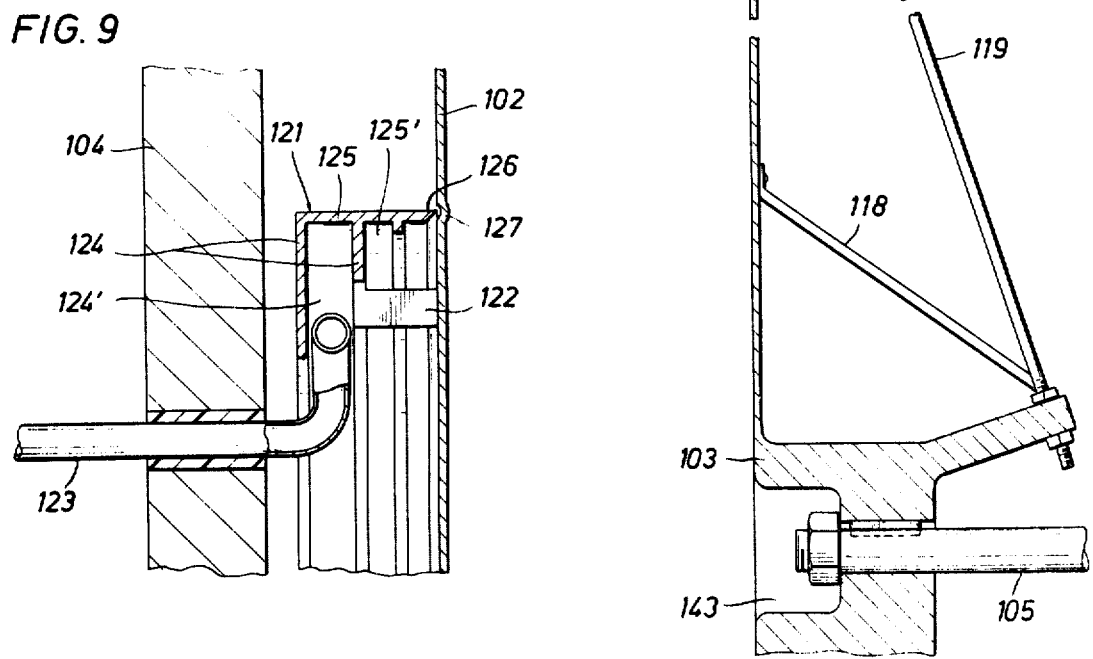
FIG. 9

ROTARY DESALINATION ENGINE AND SYSTEM

CROSS-REFERENCE TO RELATED APPLICATIONS

This is a continuation-in-part application of Ser. No. 252,202 filed May 11, 1972, entitled "Rotary Desalting Engine," now abandoned.

This is also a pending continuation-in-part application of Ser. No. 427,793 filed Dec. 26, 1973, entitled "Rotary Desalting Device."

BACKGROUND OF THE INVENTION

1. Field of the Invention

The present invention is directed to a rotary heat exchanger device for transferring heat energy between two fluids. In one aspect, the present invention is directed to a rotary desalting device for purifying and/or concentrating fluids containing dissolved materials which utilize one or more high speed, thin rotating discs as a heat transfer surface between boiling and condensing fluids. More specifically, the present invention is directed to a rotary desalting device wherein thin rotating discs are attached to a rotating hub capable of being rotated at such high speeds that the centrifugal force is hundreds of times the force of gravity causing the liquid on the rotating discs to be reduced to a micro-thin liquid film. In its more specific aspects, the rotary desalting device of the present invention may be used to convert sea water, brackish water, or polluted fresh water into potable water.

2. Prior Art

The following U.S. patents were cited in parent application Ser. No. 427,793:

| | | |
|---|---|---|
| 2,188,506 | 2,734,023 | 3,136,707 |
| 2,210,928 | 2,996,439 | 3,200,050 |
| 2,308,008 | 2,999,796 | 3,282,798 |
| 2,349,431 | 622,123 (German) | |

Currently available rotary still designs have the following disadvantages as compared to the device of the present invention.

Latham, Jr. U.S. Pat. No. 2,469,122, employs a trifluid counter-flow heat exchanger formed of concentric tubing in a helical spiral. This physical embodiment, however, cannot be disassembled for cleaning of corrosion and salt deposits.

Hickman, U.S. Pat. No. 2,734,023, utilizes a conical disc design supported from a cantilevered shaft. Because of the conical disc design, this conical disc must be quite thick since the disc supports peripherally a second disc to form a condensing chamber between the discs and/or supports peripherally axial flow compressor blades, which limit the operating speed as disclosed in Hickman to about ten times the force of gravity. Further, because the disc is supported from a cantilevered shaft with varying amounts of water, salt deposits and corrosion produced cover the inner periphery of the rotating condensing chamber; further, the disc is difficult to balance both initially and after some extended operation, which limits the operating speed, so that as claimed, only about ten times the force of gravity is achieved for the liquid film on it. This film is not reduced in thickness as much as is possible for the higher rotational speeds. The combination of a thick disc and a thick liquid film results in reduced heat transfer coefficient across the disc, which, in turn, requires greater compressor power and reduces the competitive capability of the machine. The lower operating speed produces a much thicker liquid film on the disc which results in a reduced heat transfer coefficient across the disc as compared to the device of the present invention.

For the closed ellipsoidal rotating shell design of Hickman, where the slope of the walls near the periphery approach parallelism with the rotational axis, corrosion and salt deposit collection result in a more severe unbalancing problem, disassembly for cleaning is difficult for a precision balance high speed rotor, the lower centrifugal force because of the inclined slope near the rim causes longer angular rotational contact with the fluid which results in spinning up the fluid to the disc velocity and a resultant power penalty, and heat transfer is reduced with the thicker liquid film combined with the absence of relative shear velocity between the liquid film and the near periphery of the ellipsoid. In addition, for the multi-staged ellipsoid, the deletion of a center bearing in order to accommodate the internal plumbing requires a thicker walled ellipsoid for structural support and/or intensifies the unbalance problem.

Hickman, U.S. Pat. No. 2,894,879, utilizes a liquid seal between vapor chambers at different pressures, but since this seal is oriented such that only one times the force of gravity is exerted on the liquid, it is only capable of sealing against small pressure differences.

Hickman, U.S. Pat. No. 2,899,366, utilizes a degassing system which compromises the system efficiency by discharging energy carrying vapor from the system with the dissolved gases.

Tidball, U.S. Pat. No. 3,282,798, utilizes a rubbing mechanical seal which absorbs energy through the work of friction.

In general, while some of the above patents include components similar to the present invention, none of the devices disclosed have been optimized as a system to include the right combination of components, structural design, thermal design, and fluid circuits for maximum efficiency operation to render them competitive to other means of producing potable water.

There is no known currently available sea water purification unit that, when reduced to a size suitable for residences, hotels or small industrial plants, is sufficiently efficient and inexpensive to buy, operate and maintain to be competitive with other potable water sources.

SUMMARY OF THE INVENTION

The present invention is directed to a rotary heat exchanger device for transferring heat from one fluid to another fluid which utilizes one or more thin, rapidly rotating discs. The rotating disc or discs act as heat exchange surfaces which surfaces extend essentially perpendicular to the hub and axes of rotation. One preferred embodiment of the invention is in the use of the device to desalt water containing dissolved salts. Further, the rotating discs can form condensing and evaporation chambers within the rotating disc chamber housing. The operating speed of the thin, rapidly rotating disc produces a centrifugal force of up to several hundred times the force of gravity and results in a high liquid sheer velocity. Thus, the film of liquid on the rotating disc is micro-thin. The rotating disc is sealed at its peripheral extremities by the liquid which comes from each side of the rotating disc with the disc spinning partially immersed in the liquid, causing the liquid to behave as a very heavy fluid and to seal the disc periphery against a high pressure differential. In its more specific aspects, the present invention has a design unique to the rotary desalting device to maximize the conservation of energy while producing a design of simple construction and maintenance.

BRIEF DESCRIPTION OF THE DRAWINGS

FIG. 7 is an embodiment of the seal disc of the device of FIG. 6;

FIG. 8 is a cross-section of the rotating disc of the device of FIG. 6; and

FIG. 9 is a cross-section of a mid-disc distributor on the rotating disc of the device of FIG. 6.

DESCRIPTION OF THE PREFERRED EMBODIMENTS

The rotary desalting device or engine of the present invention is specifically designed for purifying or concentrating fluids containing dissolved materials. The rotary desalting device utilizes one or more high speed, thin rotating discs as a heat transfer surface between a boiling and a condensing fluid utilizing a vapor compression distillation concept. The device of the present invention may be used to purify liquids such as converting sea water, brackish water, or polluted fresh water, into potable water. The device may further be used to purify for recycling, process chemicals, or process water in industrial plants. Alternatively, the device may be used to concentrate fluids such as film developers, nuclear wastes, or other expensively separated material, which can be purified or concentrated such that they can be either reused or stored.

Figure 1:
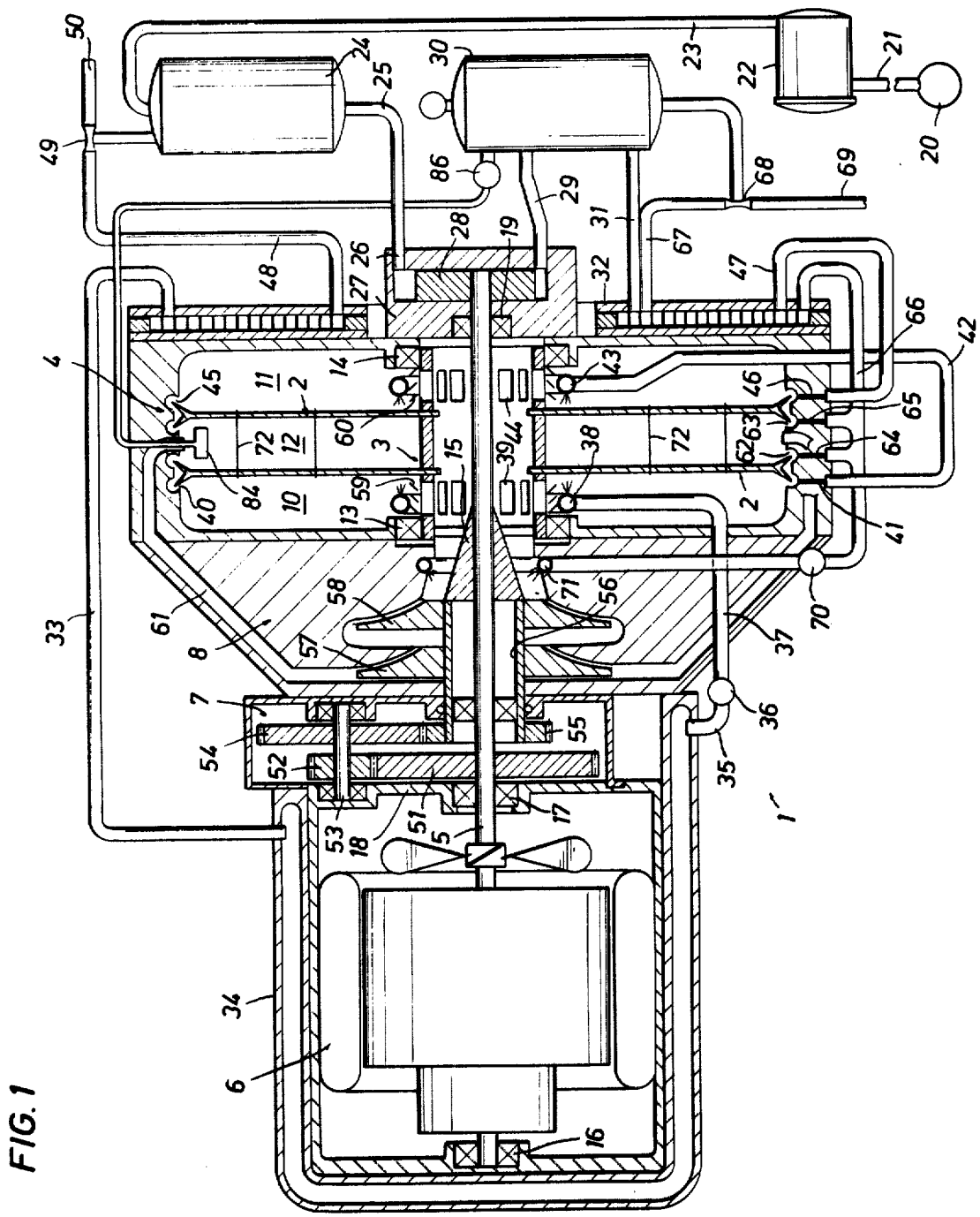
FIG. 1 is one possible embodiment of the rotary desalting device of the present invention.

To describe the present invention, and a specific operation, namely the desalination of sea water, and referring particularly to FIG. 1, a rotary desalting device or engine 1 is comprised of one or more rotating discs 2 which are mounted on and driven by a hollow drum 3 which is the hub in the rotating disc chamber housing 4. The hollow drum 3 which is sealed at one end is attached to an armature shaft 5 of a drive motor 6. The armature shaft 5 also drives a gear train 7 which in turn drives compressor fans of the compressor 8. In this embodiment, the gear train 7 and compressor 8 are between the drive motor 6 and the rotating disc chamber housing 4.

As shown in the embodiment of FIG. 1, there are two rotating circular discs 2 mounted on and driven by a hollow drum 3, which forms two evaporation chambers 10 and 11, respectively, with a single condensing chamber 12 between the two discs 2. Hollow drum 3 passes through sealed bearings 13 and 14 which are positioned in the pressure tight rotating disc chamber housing 4. The hollow drum 3 is connected and keyed integrally to the armature shaft 5 by means of a spider 15 at one end of the hollow drum 3.

In this embodiment, the rotating shaft 5 is an armature shaft of an electrical induction motor. An induction type of electric motor is preferred because of the capability of its field to operate at boiling water temperatures permitting its bar-wound armature to operate at very high temperatures without burning out. This is not possible with wire wound rotor types of motors. Also, brush type motors do not possess the required long life capability for desalinization that the induction motor possesses, especially at high temperatures. If additional heat is required, it can be supplied by electricity, or by burning fuel. It is to be understood that the rotating shaft 5 may be driven by electrical motors, combustion motors, or in large design, even a jet engine. The motor 6 drives the shaft 5 which rotates in the bearing members 16 and 17 mounted in the housing 18 of the motor 6. The shaft 5 may pass through one or more other bearing members, but is supported at its other end and passes through bearing 19 located at the opposite (sealed) end of the hollow drum 3 from the spider 15.

Sea water is drawn into the rotary desalting engine 1 through the intake strainer 20 which may consist of a perforated chamber, screen, or particle bed filter, to remove any solid material carried in with the fluid. From the intake strainer 20, the sea water passes through the tube 21 to the pretreatment chemical filter 22. The pretreatment chemical filter 22 may contain chemicals to prevent corrosion of the machine, remove objectionable taste or odor, or remove dissolved or suspended material that the process will not remove. From the filter 22, the sea water goes through the tube 23 to a liquid phase degasser 24. The details of the liquid phase degasser 24 will be set forth hereinafter. In this embodiment, the sea water is then passed through tube 25 into the inlet 26 of pump 27. The pump 27, as shown in FIG. 1, is mounted to the sealed end of the rotating disc chamber housing 4 at the sealed end of the rotating hollow drum 3. The shaft 5 passes through the bearing 19 and has keyed integrally thereto a water pump impeller 28. The sea water is pumped by the water pump impeller 28 through the tube 29 to a vapor phase degasser 30, the details of which will be set forth hereinafter. The sea water acquires a small temperature increase in the vapor phase degasser 30 and passes through tube 31 into a tri-fluid counter-flow heat exchanger 32. The sea water is heated to near its boiling temperature in the heat exchanger 32 wherein it is then passed out of the heat exchanger by tube 33 into a liquid jacket 34 which surrounds the motor 6. Waste heat from the motor 6 is conserved in this embodiment not only by the shaft energy of the drive motor, but also its waste heat, and the heated sea water is removed from the liquid jacket 34 by tube 35, providing maximum conservation of energy. This is one of several instances in the present invention where conservation of energy is achieved and the utilization of energy is made at the level at which it is available. The heated sea water flows through the thermostatic valve 36 which maintains the operation temperature at design level, and may be used to reduce the initial water flow to promote start-up heating. Hence, the valve 36 provides for automatic start-up and for stable operation at design temperatures in spite of raw feed fluid temperatures changing with changing seasons, purified fluid demand or otherwise.

The flow of the sea water up to this point has all been designed to preserve conservation of energy by utilizing all waste heat and energy in the system, and to optimize the system to its maximum. For the purification of sea water to become commercial, the system must be economical and must be optimized to make the device of simple construction and maintenance and sufficiently efficient in its operation to be competitive even in small sizes.

For sea water purification, current desalinization machines must be extremely large and expensive to achieved economical operation. They must operate at very high pressures requiring sophisticated and expensive equipment, or use membranes or microtubes which are difficult to clean or expensive to replace. For concentrating fluids, membrane filtration equipment currently available for separating solutions is limited to light concentrations of dissolved chemicals. Currently available rotary still designs have disadvantages as compared to the proposed embodiment.

From the valve 36, the sea water flows through the tube 37 into the disc chamber housing 4 to a spray ring 38 in the evaporation chamber 10. The spray ring 38 has a number of nozzles of injector plate arrangements to spray the sea water against one of the rotating discs 2 mounted on the drum 3. Alternatively, the sea water may be flowed onto the discs 2. The sea water is sprayed as a fine mist due to the size and number of the nozzles in the spray ring 38. The temperature of the side of the disc 2 in the evaporation chamber 10 is higher than the boiling point for sea water, at the pressure existing in the chamber 10, and accordingly, some of the sea water is converted to steam which passes through the openings 39 in the hollow drum 3. The remaining sea water on the disc 2 becomes a more concenntrated "brine" solution. Because of the centrifugal force imparted to the "brine" solution, as it approaches the rotation velocity of the disc 2, the "brine" solution is slung toward the periphery of the disc 2. The "brine" solution slung off the disc 2 flows into and fills one of the annular "brine" channels 40 in the rotating disc chamber housing 4. The "brine" solution is removed from the "brine" channel 40 by a tangential orifice 41 and is taken by the tube 42 to a second spray ring 43. The "brine" solution which is under pressure from the rotational velocity imparted to it from the disc is sprayed on the evaporation side of the second of the discs 2 in evaporation chamber 11. This second evaporation effect operates similarly to the first effect previously described. The temperature of the side of the disc in the evaporation chamber 11 being higher than the salt water boiling point at the pressure existing in chamber 11 results in some of the water being converted to steam which enters drum 3 through the openings 44. A higher concentrated "brine" is slung off of the second disc 2 into a concentrated "brine" channel 45. The highly concentrated "brine" is removed from the "brine" channel 45 by a tangential orifice 46 and passed through the tube 47 into the tri-fluid counter-flow heat exchanger 32. The hot brine is cooled in the heat exchanger 32 and is removed from the heat exchanger 32 by tube 48 wherein it is passed through venturi 49 to a brine outlet 50. Although a dual effect design is presented above, an alternative single effect embodiment is compatible with this machine by connecting spray rings 71 and 43 in parallel to valve 36 and connecting brine outlets 41 and 46 in parallel to tube 47.

The steam generated in evaporation chambers 10 and 11, respectively, is sucked through openings 39 and 44 in the hollow drum 3. The steam passes through the spider 15 which permits axial flow of vapor therethrough into a gas compressor 8. The gas compressor 8 may either be a multi-stage fan, or other type of single or multi-stage gas compressor. The compressor 8 may be driven by a separate motor, or as shown in this embodiment, driven by the main drive motor 6 through the gear train 7.

The gear train 7 which is merely illustrative has a drive gear 51 which is keyed to the shaft 5. The drive gear 51 drives the gear 52 on the idler shaft 53. The idler shaft 53 has keyed to it a gear 54 which drives the gear 55. The gear 55 drives the high speed drum 56 which supports and drives multi-stage compressor fans 57 and 58.

To prevent salt water particles from being sucked into the hollow drum 3 from the evaporation chambers 10 and 11, gravity drain mesh, fiber strainer, or centrifugal louvered droplet slingers 59 and 60, respectively, may be used to prevent salt water particles from entering the hollow drum 3 and the compressor 8. By using the slingers 59 and 60, the salt water particles are slung upon impacting the slingers's inclined slats radially outwardly and back toward the rotating disc 2, while the steam passes between the slats of the slingers 59 and 60 into the hollow drum 3 and into the compressor 8. The compressor 8 raises the pressure and temperature of the steam, as well as the condensation temperature, and in general, results in the steam becoming super-heated. This higher pressure steam at its higher temperature is removed from the compressor 8 through the discharge duct 61 into condensing chamber 12. This high pressure steam condenses on the surfaces of rotating discs 2 which form the condensation chamber 12. The condensed fresh water is slung from the rotating discs 2 into annular fresh water channels 62 and 63. The fresh water is removed from fresh water channels 62 and 63 by radial water outlet orifices 64 and 65, respectively. The fresh water is collected in the tube 66 which is passed into tri-fluid counter-flow heat exchanger 32. The hot fresh water is removed from the heat exchanger 32 as cooler water by the tube 67 where it is passed through a venturi 68 through outlet 69 to a pure water storage tank (not shown).

Since super-heated steam is difficult to condense in spite of the low energy required to super-heat the steam, and to provide intercooling of the compressor 8 to increase the efficiency of the compressor close to adiabatic conditions, a small quantity of fresh water is metered out of tube 66 by the valve 70 and sprayed in an extremely fine mist by spray ring or set or jets 71 into the inlet of the compressor 8. The fine spray mist of fresh water de-super-heats the steam as it passes from the hollow drum 3 into the compressor 8, and brings the steam down in temperature to saturation temperature. Alternatively, water may be sprayed into the compressor 8, in which the rotary action of the blades will further divide the water into fine particles for easier evaporation during the long path length through the compressor 8 and its discharge duct 61. The addition of water to the compressor 8 serves both to de-super-heat the steam and to remove some of the waste heat energy of the compressor 8 causes by friction, turbulence, or other energy losses, to increase the compressor efficiency, decrease compressor power requirements, and increase the mass flow of steam through the compressor 8. The saturation temperature of the steam at the compressor outlet 61 is higher than the saturation temperature under the pressure conditions at the inlet of the compressor 8. Accordingly, the condensing sides of the disc 2 are hotter than the sides where evaporation takes place. This results in net heat flow from the steam in the condensing chamber 12 to the steam in evaporation chambers 10 and 11.

While an overall general description of the rotary desalting engine of the present invention has been set forth, there are several matters relating to specific aspects of the present invention which should be set forth. The first aspect is directed to the rotating circular disc 2 which are mounted on and drive by the hollow drum 3. In the embodiment of FIG. 1, there are two discs 2 which are tied together for structural integrity and geometric stability.

Figure 2:
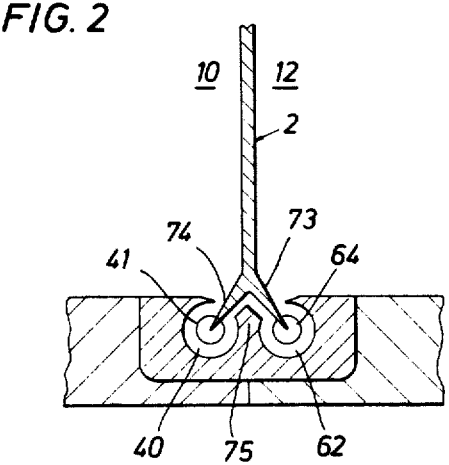
FIG. 2 is one embodiment of the disc seal.
Figure 3:
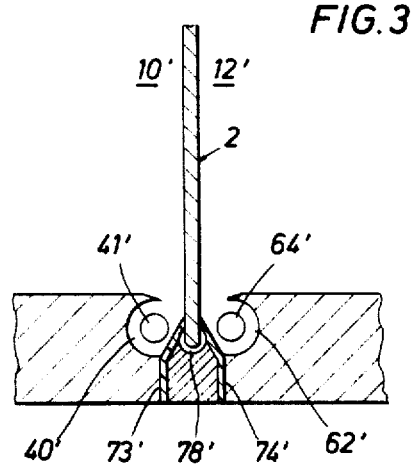
FIG. 3 is a second embodiment of the disc seal.

Around the periphery of the disc 2 are disc seal collector channels 40, 62, 63 and 45, respectively. Because fluid is forced by centrifugal forces into the collector channel, this arrangement provides a gas and liquid seal which relies solely on the hydrodynamic forces created by the disc rotation. Referring to FIGS. 2 and 3 for more detail, the disc 2 in FIG. 2 has a bifurcated terminating portion with one leg 73 extending into the channel 62. The concentrated "brine" solution which is slung from the disc 2 into the channel 40 forms a set of counter-rotating helical vortices in the channel 40 until it is withdrawn out of tangential orifice 41. The fluid as it begins to fill the channel 40 will be removed as it enters the orifice 41 which controls the fluid level in the channel. In the same manner, the fresh condensed water will be slung off the disc 2 into the channel 62 and be removed from the tangential orifice 64. The portion 75 is a rise between the channels 40 and 62 which prevents fluid from passing from one channel to the other.

Referring to FIG. 3, there is an alternative arrangement of a disc seal collector. In this modification, the disc is flat at its periphery. The chambers 10' and 12' are identical to that described in FIG. 2, as well as the channels 40' and 62' and the orifices 41' and 64', respectively. In this modification, the wiping seal is contained in the rotary disc housing structure and one portion 73' extends from the limits of the channel 40' whereas a second portion of the seal 74' extends from the channel 62'. The rotary disc extends into a depression 75' in this modification.

The fluid slung off the discs 2 flows into and fills the annular channels in rotary disc chamber housing 4. The fluid, which is under pressure due to its high centrifugal force, and which is rotating in the channels as a single clockwise vortex, or dual counter-rotating helical vortices caused by disc-induced rotation, acts in conjunction with the disc running in the channel as a pressure seal between chambers 10 and 12 and chambers 11 and 12. The level of fluid in the channels is adjusted by the position of outlet orifices relative to the bottom of the channel. The pressure of the rotating fluid is communicated to the fluid outlet so that the disc, in effect, also acts like a second pump of a centrifugal type. If this pressure is too high because of excessive fluid rotational velocity resulting in energy waste, backward curved grooves can be cut in the disc surface to reduce the fluid rotational speed.

Figure 4:
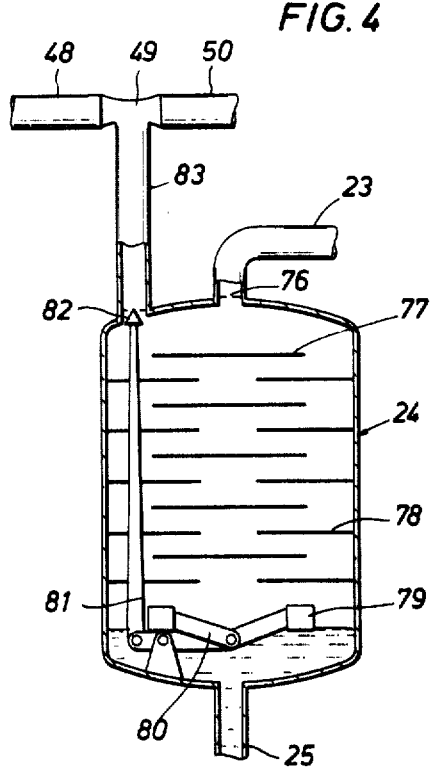
FIG. 4 is a degasser device specially adapted to handle the inlet fluid to be purified.

Another specific aspect of the present invention relates to the removal of dissolved or entrained gas in the system. Referring to FIG. 4, there is shown an example of a liquid phase device whereas in FIG. 5, there is an example of a vapor phase device.

Referring to FIG. 4, and utilizing the same reference numerals as in FIG. 1, the degasser 24 of FIG. 4 has an inlet tube 23, and an outlet tube 25. A flow control orifice 76 is in the liquid inlet tube 23 to the degasser 24. Circular peripheral flow spill trays 77 and center flow spill trays 78 are stacked alternately and spaced vertically within the degasser 24. A float 79 pivoted from the rocker arm and support 80 and hinged to the gas valve actuating rod 81 operates a valve 82 in the gas outlet 83. The pump suction applied by pump 27 through outlet tube 25 applies suction through the degasser 24 through restriction orifice 76. The impedances of the lines, filters and sea water lift requirements before degasser 24 creates the suction heat which causes the dissolved gas in the sea water to appear as small gas bubbles and evolve from the fluid as it cycles radially in and out in thin sheets over the spill trays 77 and 78. The evolved gases which are lighter than the fluid fill the top of degasser 25 from which they are sucked out through outlet 83 due to the vacuum created as the "brine" solution passes through the venturi 49. Float 79 assures that the pump is always supplied with liquid and not gas since it closes the passage to the pump when the liquid level drops and opens when the liquid rises to a set level.

Figure 5:
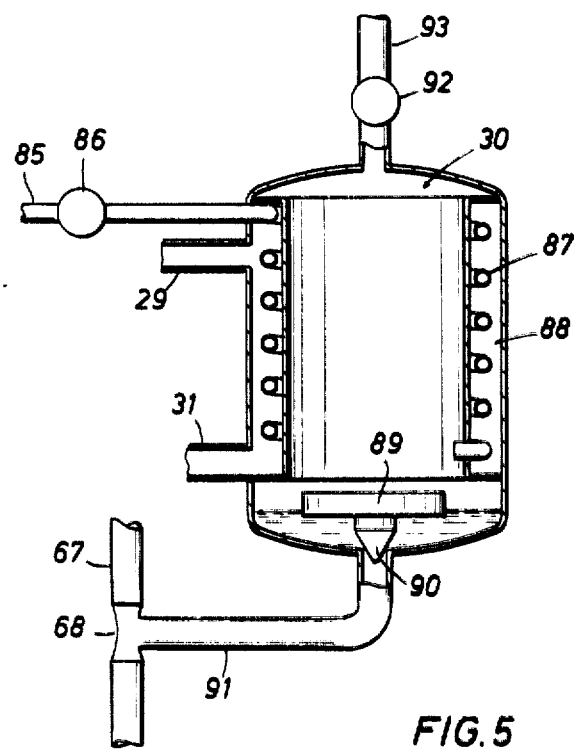
FIG. 5 is a degasser device specially designed to handle the purified fluid.

Referring to FIG. 5, the specific aspects of the degasser 30 are illustrated. Using the same reference numerals as in FIG. 1, introduced into vapor phase degasser 30 is a mixture of evolved gas and vapor picked up by a T 84 shown in FIG. 1 at the outer peripheral region of condensing chamber 12. Due to the higher density of the evolved gas as compared to the vapor, the gas is concentrated near the periphery of the rotating disc due to the centrifugal force created by the rotation. This mixture passes through the T 84 into a tube 85 and metering valve 86 which adjusts and optimizes the flow into the vapor degasser 30 to limit vapor loss with associated system energy loss. Sea water is introduced by the tube 29 into the degasser 30 whereas the water exits the degasser 30 by the tube 31. In the degasser 30, the vapor and gases from tube 85 flow through the helical tube coil 87 immersed in the liquid cooling annulus 88. The vapor is condensed into liquid or fresh water and collecting at the bottom of the degasser 30 whereas the evolved gas is cooled and collects in the gas space above the liquid. A liquid float 89 opens a valve 90 in the outlet line 91 when liquid or water collects, and which is drawn out through the fresh water line 67 by the venturi 68. Thermostatic gas valve 92 in the tube 93 allows any collected cooled gases to be removed from the system, but would block the flow of the hot vapor should there be any in the gas space.

From the above description, it is obvious that both liquid and vapor phase degassers should function with a negligible energy requirement and conserve the energy available in the fluids supplied to them. This is not true with other known degassing devices which either requires power consuming pumps or throw away energy by discharging heated vapor with the evolved gas.

Figure 6:
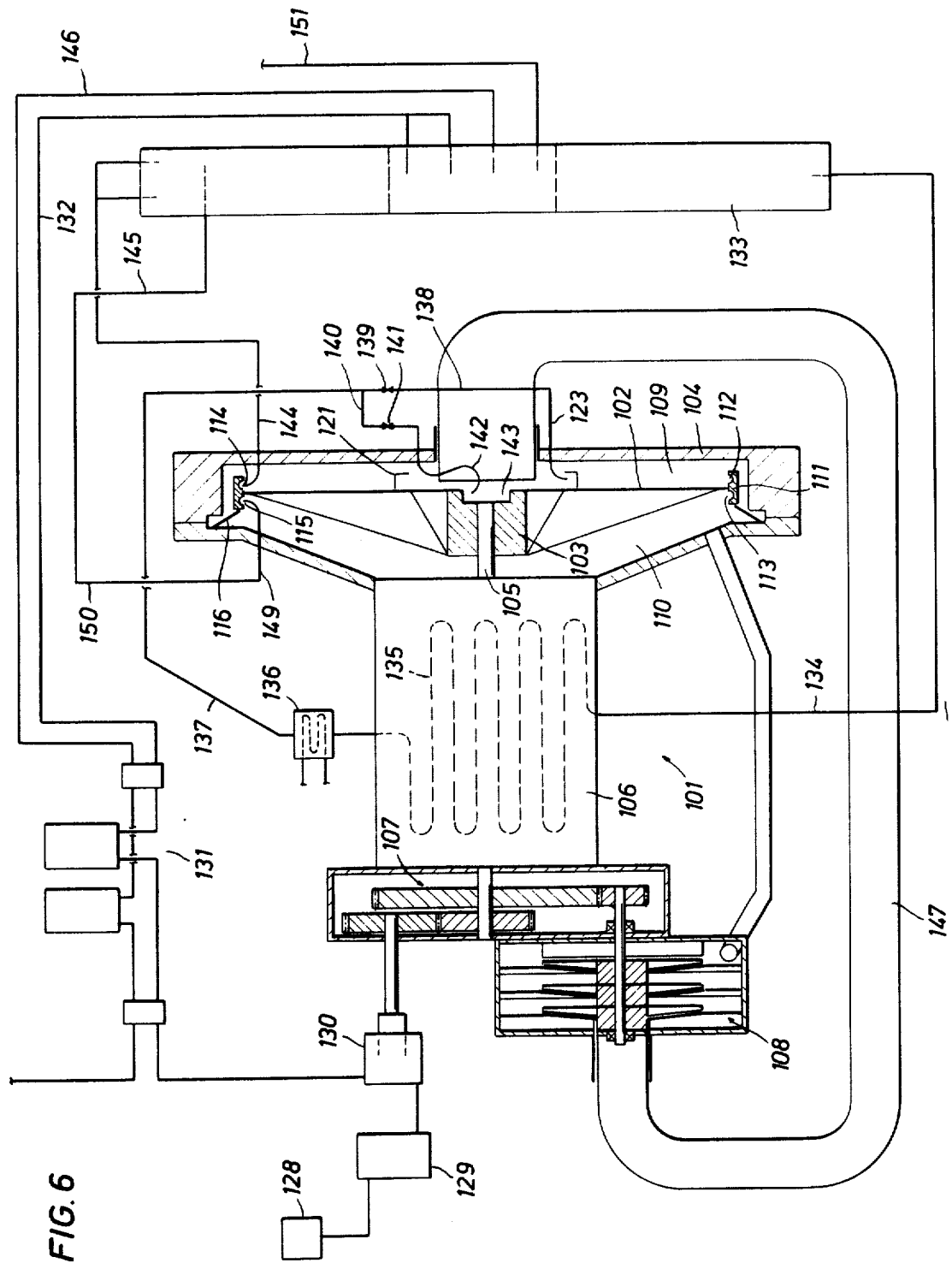
FIG. 6 is a second embodiment of the rotary desalting device of the present invention.

Referring to FIG. 6, wherein another embodiment of the present invention is illustrated, a rotary desalting device 101 has a single rotating disc 102 which extends from a hub 103. The rotating disc 102 rotates in a rotating disc chamber housing 104. The rotating disc 102 is attached through the hub 103 to an armature shaft 105 of a drive motor 106. The armature shaft 105 also drives a gear train 107 which in turn drives the compressor fan of the compressor 108.

As shown in the embodiment of FIG. 6, there is a single rotating circular disc 102 which is mounted on and driven by the armature shaft 105 which is connected to the disc by means of the hub 103. The rotating disc 102 as it rotates in rotating disc chamber 104 forms an evaporation chamber 109 on one side of the rotating circular disc 102 and a condensing chamber 110 on the other side of the disc 102. In this embodiment of the present invention, collection channel means 11 are attached to the periphery of the disc 102. The collection channel means 111 has one channel 112 to collect the "brine" from the evaporation chamber 109, and a second channel 113 which collects the fresh water from the condensing chamber 110. The details of the collection channel means 111 and each of the channels 112 and 113 are seen in more detail in FIG. 7. Inserted into each of the collection channels is one or more stationary scooping devices 114 and 115, scooping device 114 being in channel 112 and scooping device 115 being in channel 113. The scooping devices 114 and 115 are fashioned in such a way as to minimize the flow disturbances associated with placing a stationary object in a moving stream of fluid. A shield (not shown) may be placed on the scoops 114 and 115 in order to divert any fluid which is splattered by the scoop back onto the disc 102 or into the collection channels 112 or 113. By removing the fluids in the manner just described, the power loss associated with shearing of the water between a stationary channel wall and a moving disc does not occur. In this embodiment, however, the seal means between the evaporation chamber 109 and the condensing chamber 110 is a wiping seal 116 which is held within a slot in the rotating disc chamber housing 104 by means of block 117. The wiping seal 116 is placed on the side of the rotating disc 102 on the high pressure or condensing chamber 110 so as to be forced into contact with the collection channel means 111. Alternatively, the seal means in this embodiment may be a stationary member (not shown) held by the rotating disc chamber housing 104 which extends from the housing into the fluid in one of the channels in channel means 111 and seals chamber 109 from chamber 110. Preferably, however, channel means 111 would have a separate channel filled with fluid for the stationary member to extend into so as not to disturb the fluids within channels 112 or 113. Such a seal means provides a hydrodynamic seal similarly as described with regard to the embodiment of FIG. 1.

In order to allow the heat transfer from the condensing chamber 110 to the evaporating chamber 109 to be as great as possible, the disc 102 is constructed from very thin, highly heat conductive material. In order to increase the structural integrity of this thin disc 102, a system of supporting spokes may be used as is shown in FIG. 8. Two sets of spokes are shown emanating from the central hub 103 of the disc 102. Spokes 118 are attached to a mid-radius locus of the disc 102 while another set of spokes 119 are attached at the disc periphery. The spokes 119 have an adjustment capability through adjustment means 120. This adjustment capability is used to move the periphery of the disc 102 back and forth in an axial direction in order to adjust the pressure with which the wiping seal 116 bears on the collection channel means 111 and to eliminate wobble of the disc 102. This adjustment may also be used to reduce the leakage and the power drawn by the wiping seal 116.

In the embodiment of FIG. 6, the flow of water to the disc 102 is different from the embodiment set forth hereinbefore. In this embodiment one or more mid-disc distributors 121 are attached by a plurality of post means 122 to the rotating disc 102 as shown in more detail in FIG. 9. Referring to FIG. 9, water is fed from tube 123 tangentially into the top of a U-shaped member 124 which forms the outer ring 124' of the distributor 121 at a rate preferably at or near the rotational speed of the disc 102 so that the water is essentially laid into ring 124'. The plurality of post means 122 are attached at the top of the U of the U-shaped member 124. Extending from the bottom of the U of the U-shaped member 124 is a skirt means 125 which forms a second ring 125'. When outer ring 124' is full, the water overflows into a second ring 125' which also fills and overflows. By the time that the water overflows ring 125', it is uniformly distributed within the distributor 121 by attaining the same rotational velocity as the disc 102 through shear between the water and the rings 124' and 125' and becomes evenly distributed around the ring by centrifugally induced hydrostatic forces thus capable of being equally supplied to the disc 102 in all radial directions. The water overflowing the second ring 125' flows onto an extended lip means 126 which is tapered to a knife edge. The knife edge is inset into a depression region 127 of the disc 102. When the water reaches the knife edge, it is slung by centrifugal force into the wall of the depression 127 in the disc 102. Once the water has contacted the disc 102, adhesion forces causes it to remain in contact with the disc 102 and the centrifugal force causes the water to move radially outward in a thin, uniform film. The mid-disc distributor 121 being attached to the disc 102 is rotating at the same speed as the disc 102 which uniquely promotes even distribution of the water on the disc 102 and enables high heat transfer on the disc 102 due to the thin, uniform film which results. Water is shown as being fed to the disc 102 in only two locations in FIG. 6, but as many distribution places as may be practical may be used. Only the minimum amount of water required to cover the disc area between distributors 121 is fed at each distributor location. By so doing, the film thickness inside the final distributor is, on the average, significantly thinner than with a single central feed point. Hence, the resistance to heat transfer caused by the excess film thickness is overcome.

To illustrate the use of the rotary desalting device 101 a process for the desalination of sea water will be described. The sea water is drawn into the rotary desalting device 101 through an intake to a strainer 128 to remove any solid material. The sea water thereafter may pass into a liquid phase degasser 129, the details of which may be set forth hereinbefore. The water is drawn into the rotary desalting device 101 by means of pump 130 which may be driven by motor 106 through gear train 107. After the water is drawn through pump 130, the water is passed through a unique ion-exchange water pretreatment system 131 to remove dissolved or suspended material that the process will not otherwise remove. The treated water then passes through pipe 132 into a tri-fluid counter-flow heat exchanger 133. The sea water is heated to near its boiling temperature in the heat exchanger 133 and then passes out of the heat exchanger 133 by pipe 134 into a motor water jacket 135 wherein the heat from the motor 106 is picked up by the water. Water from the motor water jacket 135 flows to a heat reservoir 136 containing a heater. Thus, heat can be easily added to the water as it passes through heat reservoir 136, especially during start-up. The water exiting the heat reservoir 136 flows by line 137 where it is divided into two streams. One stream 138 is controlled by a preset valve 139 which allows a fraction of the water to be supplied to the mid-disc distributor 121. By this means a portion of the water during the start-up provides lubrication in the form of the sea water, to get to the wiping seal 116 and hastens systems start-up by restricting the water flow during start-up. The other stream 140 is controlled by a thermostatic valve 141 which remains closed until the water reaches operating temperature.

After start-up has been achieved and the system has reached operating equilibrium, the heated sea water leaves the heater reservoir 136 and flows through both lines 138 and 140, the thermostatic valve 141 being open during system equilibrium. The heated sea water flowing through line 138 is introduced by a tube 123 to the mid-disc distributor 121 and flows onto the disc 102 as has been described hereinbefore. Water flowing through line 140 is passed through a tube 142 directed into the depression 143 in the hub 103 of the disc 102. As the depression 143 fills, the water begins to overflow. The overflow of the water takes place uniformly, supplying water to the disc 102 equally in all radial directions. This uniform overflow gives rise to a uniform distribution of water on the disc 102. As can be seen by the description of the distribution of the water on to the rotating disc 102, a very thin film of water is formed uniformly on the entire rotating disc 102 increasing the heat transfer due to the extremely thin water film thickness.

As the water is introduced to the rotating disc 102 due to the heat being applied to the opposite side, the temperature of the disc in the evaporating chamber 109 is higher than the boiling point for sea water, at the pressure existing in the chamber 109, and accordingly, some of the sea water is converted to steam. The remaining sea water on the disc 102 becomes a more concentrated "brine" solution. Because of the centrifugal force imparted to the "brine" solution, the "brine" solution is slung toward the periphery of the disc 102 where it fills the collection channel 112 of the collection channel means 111. The "brine" solution is removed from channel 112 by means of scooping device 114 and removed by a tube 144 where it passed by line 145 into the tri-fluid counter-flow heat exchanger 133. The "brine" solution is cooled in the heat exchanger 133 and then removed by line 146.

The steam generated in evaporation chamber 109 is passed through tube 147 into the gas compressor 108. The gas compressor 108 may either be a multi-stage fan, or other type of single or multi-stage gas compressor. A compressor 108 may be driven by a separate motor, or as shown in FIG. 6, driven by the main drive motor 106 through the gear train 107.

The steam after compression is in a super heated condition when it exits the compressor 108. It exits through a pipe 148 where it is passed into the condensing chamber 110. In the pipe 148 may be a spiral tube (not shown) wherein a small amount of fresh water may be introduced into the super heated steam leaving the compressor 108. The water flowing through the spiral tube of the de-super heater is heated by the steam which flows around the tube. The water thus enters the stream of super heated steam in pipe 148 as heated water or a mixture of water and saturated steam and is readily entrained by the moving stream which has lost its super heat energy to the fresh water by the time it reaches the condensation chamber 110. The advantage of such a de-super heater is that it does not necessitate introducing the de-super heating water as a finely divided spray.

The compressed steam which enters the condensation chamber 110 is restrained from passing around the periphery of the rotating disc 102 into the evaporation chamber 109 by the wiping seal 116. The steam condenses on the rotating disc 102 where it is slung by the centrifugal forces to the periphery of the rotating disc 102 and the water collection channel 113. The scooping device 115 picks up the water and passes it through tube 114 where it is passed by line 150 to the tri-fluid counter-flow heat exchanger 133. The cooled fresh water is removed from the heat exchanger 133 through pipe 151 where it is passed to a pure water storage tank (not shown).

Whereas the prior art discloses distillation operations with rotating cones and curved drums at low rotational speeds producing centrifugal accelerations of the water of 10's of "g's," the present invention permits 100's or 1,000's of g's of centrifugal acceleration of water because of the design of the plane disc, seal and water distribution system. This high acceleration coupled with the unique water distribution system causes a very thin, uniform water film on the disc, which in turn produces a heat transfer coefficient of about five times that claimed in publications related to the prior art. For example, the design of the present invention has permitted a disc heat transfer coefficient of 8,700 BTU/ft$^2$ hr, F° for a 16 inches diameter disc rotating at 1,725 RPM which produces 680 g's at the perimeter. A 6' diameter disc rotating at this speed would produce 2,500 g's at the perimeter and a somewhat higher heat transfer coefficient. Since a contiguous film was obtained in practice on a 16 inch diameter disc turning at 3,450 RPM with a perimeter centrifugal acceleration of 2,720 g's which is approximately equal to the g's on the 6 foot disc, the 6 foot disc may be operated at the 1,725 RPM speed. Because of the difficulty of spinning flexible curved drums or cones at high speed with their attendant vibration and distortion problems under load, it is not believed that the high g's are possible with the prior art, since for good heat transfer, the drums or cones must necessarily be thin and are necessarily limited in size.

The foregoing description has been directed to one preferred embodiment of the present invention wherein a rotary heat exchanger is utilized to desalt water that contains dissolved salts, such as sea water. However, the present invention is directed to more broad aspects wherein the unique rotary heat exchanger can be utilized to exchange heat between other fluids having differing temperatures. By using the basic concepts of the present invention, rotary heat exchangers having extremely high heat transfer efficiencies can be fabricated for exchanging heat between many types of fluids.

Highest heat transfer efficiencies can be realized using the rotary heat exchanger devices of the present invention if at least one of the fluids being subjected to heat exchange is at least partially a vaporizable liquid. Thus, one of the fluids being subjected to heat exchange in the present invention should contain either a vaporizable liquid that will undergo at least partial vaporization during the heat exchange cycle or the fluid should contain a vapor that will undergo at least partial condensation during the heat exchange cycle.

Highest heat transfer efficiencies are obtained when both of the fluids being subjected to heat exchange undergo phase change wherein there is at least partial vaporization on one side of the rotating disc and at least partial condensation on the other side of the rotating heat exchange disc. When operating in this mode, extremely high heat exchange efficiencies are achieved wherein the heat of vaporization and the heat of condensation are rapidly transferred through the spinning disc within the heat exchanger housing. As previously pointed out herein, the high speed rotation of the heat exchanger discs within the rotating housing produces a very thin coating of the liquid on the surface of the heat exchanger disc. Because the liquid serves as an insulating film, the very thin liquid coating being distributed uniformly across the surfaces of the heat exchanger disc results in extremely high heat transfer efficiencies.

The rotary heat exchanger devices of the present invention find wide utility in the exchange of heat energy between fluids of many different types. By making relatively simple modifications in the rotary heat exchanger devices as previously discussed for the desalting of salt water, the heat exchanger devices of this invention can be utilized to transfer heat energy between the fluids having completely different compositions. Therefore, the heat exchanger devices of this invention will find wide utility in the petroleum and chemical industries wherein high efficiency heat transfer is required in various processes. The rotary heat exchanger devices of this invention are particularly useful in the chemical industry wherein extremely corrosive fluids are subjected to heat exchange with other fluids.

By utilizing the instant invention, the rotating discs, that serve as heat exchange surfaces, can be constructed of exotic and expensive alloy material that will resist corrosion. The rotating disc can also be very thin, thus requiring less of the expensive corrosion resistant material to be used than is normally used in conventional shell and tube heat exchanger devices. Because of the extremely high heat transfer efficiencies realized in the devices of the instance invention, the rotating discs can further be of relatively low surface area when compared with conventional shell and tube heat exchangers. Thus, material savings can be realized in the cost and efficiency of the heat exchanger devices of this invention when compared with conventional shell and tube heat exchanger devices used in the chemical and petroleum industries. Other advantages relating to the cost of maintenance will also be realized with the instant invention because of the ease of cleaning the instant devices when compared with the cleaning of shell and tube heat exchangers.

When the heat exchanger devices of this invention are utilized to exchange heat between fluids having different compositions, it is often desirable to operate both chambers of the rotary heat exchanger at or near the same pressure. Thus, the vaporization chamber and the condensation chamber can be operated at or near the same pressure to achieve extremely high heat transfer efficiencies with absolutely no communication of materials from one chamber into the other because of pressure differentials. Thus, the wiper seal that can be utilized to contact the periphery of the rotating disc will serve merely as an additional safeguard against mixing of fluids from one chamber with fluids from the other chamber. By utilizing the collection channel means as disclosed and illustrated in FIG. 7, substantially all of the liquid that is slung off the surfaces of the rotating disc can be collected in both chambers with absolutely no mixing of liquids or vapors between the two chambers because of the neglible pressure differences between the two chambers. When the two chambers are operated at approximately the same pressure, the liquid seal that is disclosed above and illustrated in FIG. 2 becomes particularly advantageous for the collection of liquids from the two chambers.

Various other modifications may be made in the heat exchanger devices that have been described above. For example, the device illustrated in FIG. 7 can be easily modified to delete the liquid collection channel 111 as well as the liquid withdrawal conduit 114. With such a modification, liquid that is slung from the right-hand surface of rotating disc 112 would merely be slung into the open annular space between the edge of the rotating disc and the rotating disc housing. Once the liquid collects in the annular space, it could be withdrawn by means of drain ports in the housing communicating with the annular space between the edge of the rotating disc and the housing. Of course, the drain ports could be tangentially bored into the housing to collect the liquid that would be swirling around the annular space between the edge of the rotating disc and the housing.

It should be further understood that when the rotary heat exchanger devices of the instant invention are utilized for high efficiency heat transfer between various fluids, it is not necessary in all cases to include the vapor compressor means that have previously been discussed with reference to the rotary desalting device.

The foregoing specification has been directed to only a few preferred embodiments of the instant invention. It is understood that various modifications and changes can be made in the devices illustrated and described above without departing from the spirit and scope of this invention.

The nature and objects of the present invention having been completely described and illustrated, and the best mode thereof contemplated set forth, what I wish to claim as new and useful and secure by Letters Patent is:

I claim:

1. A rotary desalting engine system which comprises:
   a rotating drum;
   at least one circular disc mounted on and fixed to said rotating drum;
   said drum being hollow, permeable, and located centrally in a rotating disc chamber housing wherein each disc divides said housing into at least two chambers, at least one of which is low pressure and one of which is high pressure;
   said disc being a thin highly thermally conductive plate permitting rapid heat transfer through it between chambers;

channels located in the periphery of the disc chamber in said rotating disc chamber housing in which said discs rotate;

tangential outlets in said rotating disc chamber housing from said channels which maintain the liquid level over the disc periphery to provide a seal which prevents gas passage around the disc between chambers and to remove the liquids which are collected and maintained separated in said channels;

a rotating shaft to which said drum is attached;

motor means for rotating said shaft;

pump means for bringing inlet fluids into said engine;

a tri-fluid counter-flow heat exchanger through which said inlet fluids are passed for heating;

a jacket around said motor through which said inlet fluid passes and is heated by the waste heat from said motor means;

means for spraying the heated inlet fluids against a surface of said discs in the low pressure chamber wherein some of said fluid evaporates and a concentrated liquid is slung from said disc into one of said channels;

compressor means for compressing said vapors formed in the low pressure chamber and which pass through said drum into said compressor means and for introducing the compressed vapors to the high pressure chamber of said rotating disc chamber housing wherein said vapors condense on said rotating disc and are slung from said disc into one of said channels;

passage means for connecting said tangential outlets to said tri-fluid heat exchanger and passing the liquid collected and maintained separated in said channel through said exchanger whereby they are cooled; and, means for eliminating air or other entrained gases from the system which includes a liquid phase degasser in the inlet fluid line for expanding entrained gases within said inlet fluid and expanding said gases to permit their separation at virtually no expense of energy and a vapor phase degasser which collects vapor bled from the high pressure condensing chamber and condenses the vapor to add to the purified liquid while expelling the evolved gases to the atmosphere.

2. A rotary engine system according to claim 1 wherein said shaft drives the compressor fans of said compressor.

3. A rotary engine system according to claim 1 wherein said shaft drives the pump impeller of said pump means.

4. A rotary engine system according to claim 1 which further includes
a chemical pretreatment filter for removing particles and/or corrosion causing chemicals from the inlet fluid connected in the fluid inlet line.

5. A rotary engine system according to claim 1 which further includes
means for injecting a very fine mist of purified liquid into the compressor inlet duct of said compressor to de-super-heat the vapors formed in the low pressure chamber and increase the compressor efficiency through intercooling.

6. A rotary engine system according to claim 1 wherein said shaft is the armature shaft of an electrical induction motor.

7. A rotary engine system according to claim 1 which further includes
a normally closed thermostatic valve in the fluid feed line for automatic start-up and for stable operation at design temperatures in spite of fluid feed temperature changes.

* * * * *